Feb. 5, 1924.
P. H. GASKINS
LUBRICATING SYSTEM
Filed Nov. 24, 1922
1,482,645
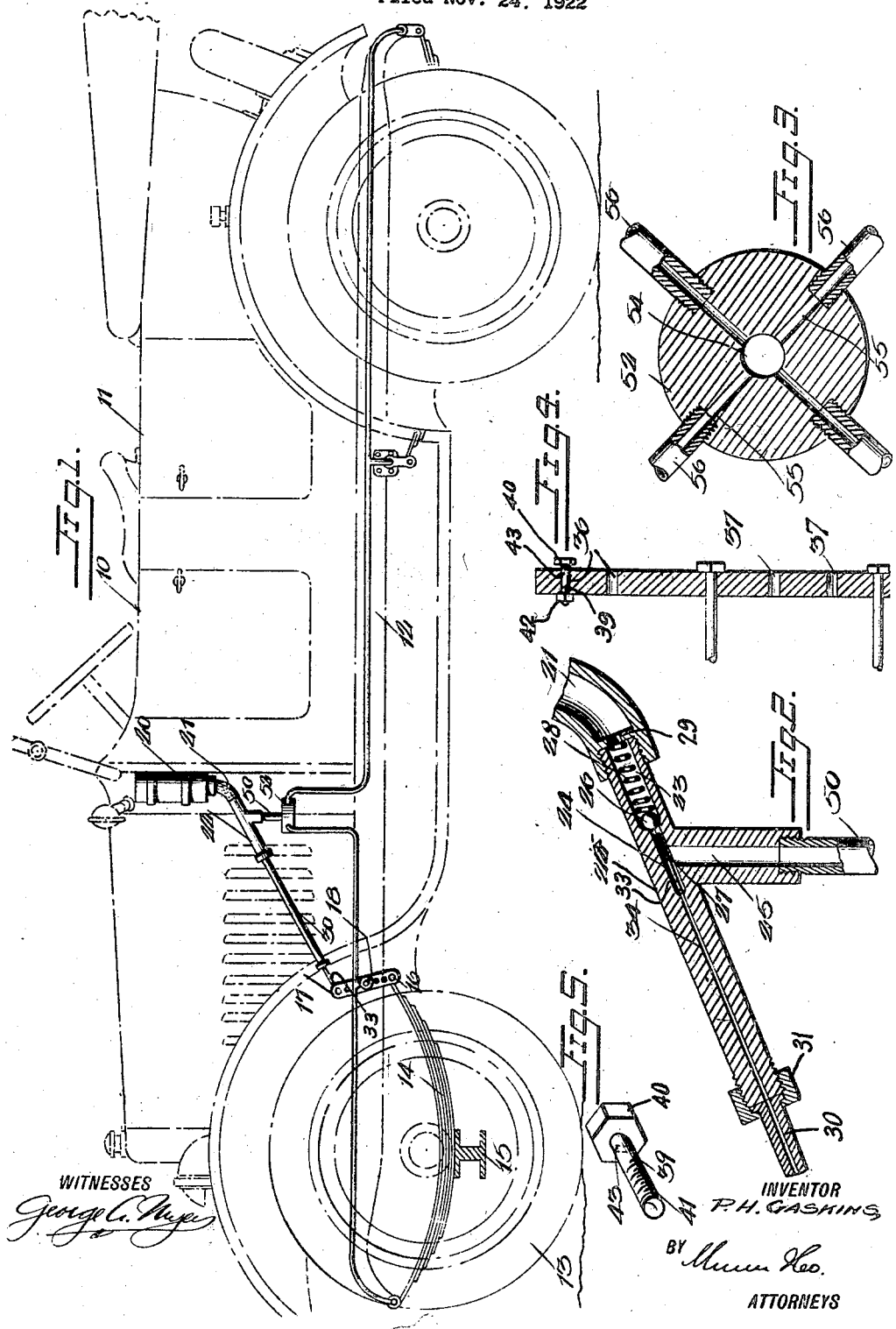

Patented Feb. 5, 1924.

1,482,645

UNITED STATES PATENT OFFICE.

PALEMON HILSMAN GASKINS, OF JACKSONVILLE, FLORIDA.

LUBRICATING SYSTEM.

Application filed November 24, 1922. Serial No. 603,050.

*To all whom it may concern:*

Be it known that I, PALEMON HILSMAN GASKINS, a citizen of the United States, and a resident of Jacksonville, in the county of Duval and State of Florida, have invented certain new and useful Improvements in Lubricating Systems, of which the following is a specification.

This invention relates to an improvement in lubricating systems especially adapted for use with motor vehicles, such as automobiles or the like.

The object of the invention is to provide a lubricating system which will automatically supply to the parts to be lubricated the proper amount of lubricant at the times when thorough lubrication is most needed, and to this end the invention contemplates the provision of a reservoir for the lubricant and conveying devices leading therefrom to the parts to be lubricated, the reservoir being located above the points to be lubricated so that the lubricant feeds by gravity thereto, there being a normally closed valve interposed between the reservoir and the conveying devices and means being provided in conjunction with the valve for opening the same in accordance with the flexure of the springs which support the vehicle.

Further objects of the invention reside in the provision of novel means for the actuation or opening of the valve in order to permit of the flow of lubricant and of novel means for distributing the lubricant to the parts to be lubricated.

Another object is to provide a device of this character which is simple and durable in construction, which may be readily installed on the standard types of automobiles, and which is reliable in operation and easy and comparatively inexpensive to manufacture.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a view in side elevation, showing the preferred embodiment of the invention applied to an automobile, the showing of the automobile being largely diagrammatic;

Figure 2 is a view, partly in section and partly in elevation, illustrating the valve, the valve casing and its connection;

Figure 3 is a detail view in horizontal section illustrating the distributor head;

Figure 4 is a view of the shackle; and

Figure 5 is a detail view of the connecting bolt utilized for associating the steel wire with the shackle extension.

Referring to the drawings wherein for the sake of illustration is shown the preferred embodiment of the invention, the numeral 10 designates generally an automobile. It is to be understood however that the invention is applicable to various types of vehicles, it being shown and applied to an automobile for the sake of illustration. The automobile is of standard construction, and includes a body 11 supported on a chassis or frame 12, which in turn is mounted on the wheels 13 by means of springs 14 and axles 15. The springs may be connected with the axle and with the chassis in any approved manner and in the arrangement shown one end of the front spring is pivotally connected, as at 16, to one end of a shackle 17, the shackle 17 being pivotally connected intermediate its ends, as at 18 to the chassis 12 of the vehicle. This much of the structure of the vehicle is referred to specifically for the sake of illustration since the flexure of the spring is utilized as a motive agency for actuating or opening the valve as will presently be described.

The lubricating system which constitutes the present invention includes a reservoir 20 mounted on the cowl dash of the automobile at a point well above the points to be lubricated and containing the supply of oil or lubricant. From the bottom of the reservoir 20 a discharge pipe 21 leads and connects with one end of the valve casing 22. The valve casing 22 is provided with a cavity 23 in open communication with the discharge pipe 21 of the reservoir and the inner end of the cavity 23 communicates with the axial passage 24 which in turn communicates with a laterally extending nipple 25. The flow of oil from the reservoir through the pipe 21, cavity 23, passage 24 and nipple 25 is controlled by a ball valve 26 normally seated against a valve seat 27 formed at the inner end of the cavity 23 around the passage 24, the valve 26 being held against the seat 27 by a coil spring 28 engaging the valve at one end and an annular shoulder 29 at its other end.

In order to provide for the opening of the valve and consequently of the flow of lubricant when it is most desirable to have the parts of the automobile lubricated means is provided for opening the valve 26 in accordance with the flexure of the spring 14. This means includes an elongated tubular casing 30 connected with the valve casing 22 by a nut 31 or other suitable means. Through the casing 30 a steel wire 33 extends. This steel wire 33 also extends through an axial opening or bore 34 provided therefor in the valve casing 22 and through the passage 24 of the valve casing 22 to a point adjacent the ball valve 26. One end of the steel wire 33 is engageable with the ball valve 26 and the other end is connected with the spring 14, preferably by means of the shackle 17 although it is to be understood that this steel wire may be otherwise connected to the spring 14. For instance the wire 13 may be directly connected with the spring 14 or it may be connected with one end of the bell crank pivoted on the chassis, the other end of the bell crank being connected by a pitman or the like with the spring. In the arrangement illustrated for the sake of illustration the steel wire 33 is adjustably connected with the shackle 17, the shackle being extended for this purpose and being provided with a plurality of openings, designated at 36 and 37, the openings 36 being on the upper side of the pivotal connection of the shackle to the chassis, and the openings 37 being on the lower side of such pivotal connection. A bolt 39 is selectively cooperable with any one of these openings. The bolt 39 is provided at one end with a head 40 and is threaded at its opposite end so as to be cooperable with a nut 42. Adjacent the headed end of the bolt a transverse bore 43 is formed in the shank thereof and through this bore the adjacent end of the steel wire 33 is extended and suitably secured. If desired the steel wire may be clamped or bound in the bore 43 by tightening up on the nut 41 sufficiently to cause the wire to come into binding engagement with the shackle.

The outlet nipple 25 of the valve casing communicates by a pipe 50 with a distributing head 52 shown in detail in Figure 3 and comprising a short cylindrical block of metal having an axial bore 54 to which the pipe 50 is connected, the axial bore 54 communicating with a plurality of radial bores 55. Each radial bore 55 is connected with a conveying device, such as a pipe 56 which leads from the distributing head to the various points to be lubricated.

In operation the spring 28 holds the valve 26 against its seat and prevents flow of the lubricant when the vehicle is standing still. When however the vehicle is in motion and going over the road the springs of the vehicle will come in action and will flex to absorb the road shocks. This flexure of the spring is transmitted to the shackle 17 which in turn actuates or reciprocates the steel wire 33. If the steel wire 33 is connected to either of the openings 36 the wire will be moved away from the ball valve 26 on the impact but on the rebound it will be moved toward and into engagement with the ball 26 so as to move this ball valve away from its seat 27 and permit flow of the lubricant from the reservoir through the discharge pipe 21 to the valve casing, and thence through the distributing head to the parts to be lubricated. As soon as the rebound has been completed and the spring assumes approximately its normal position the valve 26 will again be moved against its seat by the spring 28 to prevent further flow of lubricant.

If it is desired to take advantage of the impact to open the valve the steel wire 33 is connected to the shackle through one of the openings 37, and of course the valve casing and tube 30 are suitably inclined for this purpose, this inclination may be brought about by utilizing discharge pipes 21 of different curvature.

I claim:

1. In a lubricating system for use with automobiles having a spring mounted for flexure, a reservoir for the lubricant positioned above the points to be lubricated, a valve casing communicating with the reservoir, a discharge head communicating with the valve casing, and conveying devices leading from the discharge head to the points to be lubricated, a spring seated ball valve mounted in the valve casing and controlling the flow of lubricant, and means for opening said ball valve including a steel wire connected at one end to the spring and engageable at its opposite end with the ball valve, and an elongated tubular casing enclosing the steel wire and supported upon the valve casing.

2. In a lubricating system for use with automobiles or the like having a spring mounted for flexure, a spring closed valve for controlling the flow of lubricant, and means for opening the valve as the spring is flexed including a steel wire connected with the spring and engageable with the valve for opening the same, and an enlongated tubular casing enclosing the wire.

3. In a lubricating system for use with automobiles having a spring mounted for flexion, the mounting of the spring including a shackle, said shackle being provided with a plurality of spaced openings, a lubricant supply, a valve casing connected with the lubricant supply and having a spring closed valve therein, conveying devices connected with the valve casing and with the points to be lubricated, and means for opening the valve in accordance with the flexure of the spring including a steel wire having one end engageable with the valve for opening the same as the spring is flexed, and means for selectively connecting the other end of the wire with any of the openings of the shackle.

4. In a lubricating system for use with automobiles or the like having a spring mounted for flexure, a spring closed valve for controlling the flow of lubricant, and means for opening the valve as the first-mentioned spring is flexed, said means including a wire connected with the spring and cooperable with the valve for opening the same.

5. In a lubricating system for use with automobiles or the like having a spring mounted for flexure, a normally closed valve for controlling the flow of lubricant, and means connected with the spring and cooperable with the valve for opening the same as the spring is flexed.

PALEMON HILSMAN GASKINS.